United States Patent [19]
Konno et al.

[11] Patent Number: 5,956,205
[45] Date of Patent: Sep. 21, 1999

[54] DISK HOLDING MECHANISM CAPABLE OF PREVENTING A DISK FROM UNDESIRABLE VIBRATION WITHIN A DISK HOLDER UNIT

[75] Inventors: Makoto Konno, Mogami-gun; Hisashi Shibata, Yamagata; Masaki Kato, Obanazawa, all of Japan

[73] Assignee: Mitsumi Electric Co., Ltd., Tokyo, Japan

[21] Appl. No.: 08/972,592

[22] Filed: Nov. 18, 1997

[30] Foreign Application Priority Data

Nov. 19, 1996 [JP] Japan .................................. 8-308368

[51] Int. Cl.$^6$ ................................................. G11B 17/022
[52] U.S. Cl. ..................................... 360/99.02; 360/99.12
[58] Field of Search ............................. 360/98.08, 99.02, 360/99.05, 99.12

[56] References Cited

U.S. PATENT DOCUMENTS

| | | | |
|---|---|---|---|
| 4,694,363 | 9/1987 | Nakamori et al. | 360/99.05 X |
| 4,827,364 | 5/1989 | Sheriff | 360/99.05 |
| 4,989,107 | 1/1991 | Tsukahara | 360/99.08 |
| 5,592,350 | 1/1997 | Uehara et al. | 360/99.12 |

*Primary Examiner*—John H. Wolff
*Attorney, Agent, or Firm*—Frishauf, Holtz, Goodman, Langer & Chick, P.C.

[57] ABSTRACT

A disk holding mechanism for use in a disk apparatus includes a disk holder unit (60) for holding a disk (40) inserted into the disk apparatus. The disk holder unit includes a leaf spring (63) which serves as an urging member for urging a substantial center of the disk downwardly from an upper surface of the disk with the disk held in the disk holder unit. The urging member prevents the disk from vibrating within the disk holder unit and restricts vertical movement of the disk itself even if the disk apparatus is subjected to external shake or shock. Thus, it is possible to constantly maintain stable head touch of a magnetic head to a magnetic disk medium (41) of the disk.

2 Claims, 6 Drawing Sheets

DISK HOLDING MECHANISM CAPABLE OF PREVENTING A DISK FROM UNDESIRABLE VIBRATION WITHIN A DISK HOLDER UNIT

BACKGROUND OF THE INVENTION

This invention relates to a disk apparatus such as a floppy disk drive for carrying out data writing/reading operations upon a magnetic disk medium of a floppy disk and, in particular, to a disk holding mechanism for holding a disk such as a floppy disk in a disk apparatus.

As well known, a floppy disk drive (FDD) is a drive unit for carrying out data writing/reading (recording and reproducing) operations upon a magnetic disk medium of a floppy disk inserted therein. In order to carry out such data recording and reproducing operations, the floppy disk drive must hold and rotate the floppy disk. At this time, it is required to fixedly hold the floppy disk so that its case is not moved and to chuck the floppy disk. A mechanism for fixedly holding the floppy disk so that its case is not moved is called a disk holding mechanism while a mechanism for chucking the floppy disk is called a disk chucking mechanism.

The floppy disk has a magnetic disk medium contained within the case. In addition, the floppy disk has a disk hub formed at the center of a rear surface of the case. The disk holding mechanism includes a disk holder unit for holding the floppy disk. The disk chucking mechanism includes a disk table for magnetically attracting the disk hub.

In the floppy disk drive of the above-mentioned structure, the floppy disk drive may be subjected to external shake or shock during execution of the data writing/reading operations upon the magnetic disk medium of the floppy disk (i.e., during the operation of the floppy disk drive). In this event, the disk table of the disk chucking mechanism vibrates in the vertical direction because the disk table has a backlash or looseness with respect to a drive body of the floppy disk drive. Since the disk hub of the floppy disk is no more than magnetically attracted onto the disk table, the floppy disk itself vibrates in the vertical direction with respect to the drive body. Vibration of the! floppy disk in the vertical direction with respect to the drive body brings about unstable head touch to the magnetic disk medium of the floppy disk when it is accessed by a magnetic head. This results in occurrence of a data reading error for the magnetic disk medium.

SUMMARY OF THE INVENTION

It is therefore an object of this invention to provide a disk holding mechanism capable of preventing occurrence of a data reading error even if a disk apparatus is subjected to external shake or shock during operation and to provide the disk apparatus comprising the mechanism.

It is another object of this invention to provide a disk holding mechanism capable of constantly maintaining stable head touch of a magnetic head to a magnetic disk medium even if a disk apparatus is subjected to external shake or shock during operation and to provide the disk apparatus comprising the mechanism.

It is still another object of this invention to provide a disk holding mechanism capable of restricting vertical movement of a disk itself when a disk apparatus is subjected to external shake or shock during operation and to provide the disk apparatus comprising the mechanism.

According to a first aspect of this invention, there is provided a disk holding mechanism which is for use in a disk apparatus and which comprises a disk holder unit for holding a disk inserted into the disk apparatus, wherein the disk holder unit comprises urging means for urging a substantial center of the disk downwardly from an upper surface of the disk with the disk held in the disk holder unit so that the urging means prevents the disk from vibrating within the disk holder unit even if the disk apparatus is subjected to external shake or shock.

According to a second aspect of this invention, there is provided a disk apparatus comprising a disk holding mechanism having a disk holder unit for holding a disk inserted in the disk apparatus, wherein the disk holder unit comprises urging means for urging a substantial center of the disk downwardly from an upper surface of the disk with the disk held in the disk holder unit so that the urging means prevents the disk from vibrating within the disk holder unit even if the disk apparatus is subjected to external shake or shock.

According to this invention, the urging means urges the substantial center of the disk downwardly from its upper surface. Therefore, even if the disk apparatus is subjected to external shake or shock, the disk can be prevented from vibrating within the disk holder unit.

DESCRIPTION OF THE PREFERRED EMBODIMENTS

Prior to description of a disk holding mechanism according to this invention, a floppy disk will at first be described. The floppy disk is a recording medium which comprises a thin disk coated with a magnetic material to magnetically record data for reading/writing operations and which is accommodated in a rectangular case made of a plastic material. The floppy disk is also called a flexible disk or a diskette.

Figure 1:
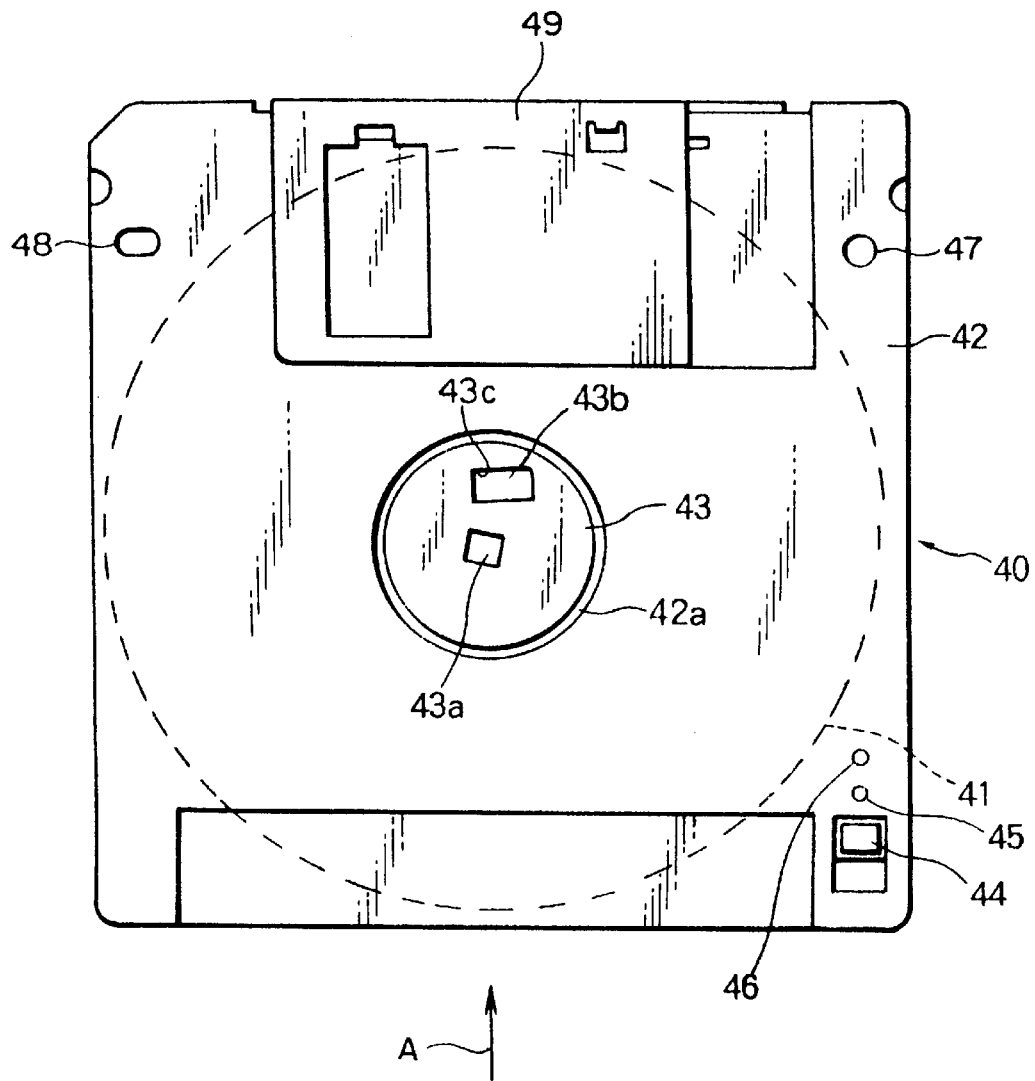
FIG. 1 is a plan view of a floppy disk to be accessed by a floppy disk drive having a disk holding mechanism according to this invention, as seen from a rear side.

FIG. 1 is a plan view of the floppy disk 40 to be held by the disk holding mechanism and to be chucked by a disk chucking mechanism, as seen from a rear side. The floppy disk 40 illustrated in the figure is a large-capacity floppy disk having a size of 3.5 inches and comprises a magnetic disk medium 41 as a magnetic recording medium and a case 42 covering the magnetic disk medium 41. The case 42 is made of a plastic material and has a rectangular shape. The case 42 has a circular opening 42a formed at the center of a rear surface of the case 42. In the circular opening 42a, a disk hub 43 holding the magnetic disk medium 41 is loosely fitted. The disk hub 43 is a disk-shaped metal fitting made of a ferromagnetic metal material. The disk hub 43 has a disk center hole 43a formed at its center and a driving elongated hole 43b formed at a position offset from the disk center hole 43a. The disk center hole 43a has a rectangular shape. A spindle shaft which will later be described is inserted into the disk center hole 43a. In the driving elongated hole 43b, a drive roller which will later be described is loosely fitted. The driving elongated hole 43b may be called a chucking hole and the drive roller may be called a chucking pin.

The case 42 of the floppy disk 40 is provided with a write protection hole formed at a righthand corner at a backward end in an insertion direction depicted by an arrow A in FIG. 1, as seen from the rear side (lefthand corner if seen from a top side). In FIG. 1, the write protection hole is closed by a write protection tab 44. The write protection tab 44 is slidable in the insertion direction A and manually operated to open and close the write protection hole. When the write protection hole is closed by the write protection tab 44, a recordable state is selected. When the write protection hole is opened by the write protection tab 44, an unrecordable state is selected.

The large-capacity floppy disk 40 illustrated in the figure is an example in case of presence of two types of storage capacities (for example, 128 Mbytes and 256 Mbytes). In the vicinity of the write protection hole, a large-capacity identification hole 45 is formed. The large-capacity identification hole 45 is for identifying the large-capacity floppy disk 40. The large-capacity identification hole 45 is not formed in a normal--capacity floppy disk. In addition, a type identification hole 46 is selectively formed in the vicinity of the write protection hole together with the large-capacity identification hole 45. The type identification hole 46 is for identifying the type of the large-capacity floppy disk. The type of the large-capacity floppy disk can be identified by presence or absence of this hole. For example, the type identification hole 46 is not formed in the case 42 if the large-capacity floppy disk has a storage capacity of 128 Mbytes while the type identification hole 46 is formed in the case 42 if the large-capacity floppy disk has a storage capacity of 356 Mbytes.

Furthermore, the case 42 has engaging holes 47 and 48 formed in its rear surface at righthand and lefthand corners forward in the insertion direction depicted by the arrow A in FIG. 1, respectively, to be engaged with engaging pins which will later be described. As illustrated in FIG. 1, the engaging hole 47 has a circular shape while the engaging hole 48 has an elongated shape extending in a direction perpendicular to the insertion direction depicted by the arrow A. A reference numeral 49 represents a shutter.

Upon chucking the floppy disk 40, the drive roller (chucking pin) of the disk chucking mechanism is brought into contact with a radially outward corner 43c of the driving elongated hole (chucking hole) 43b of the disk hub 43.

Figure 2:
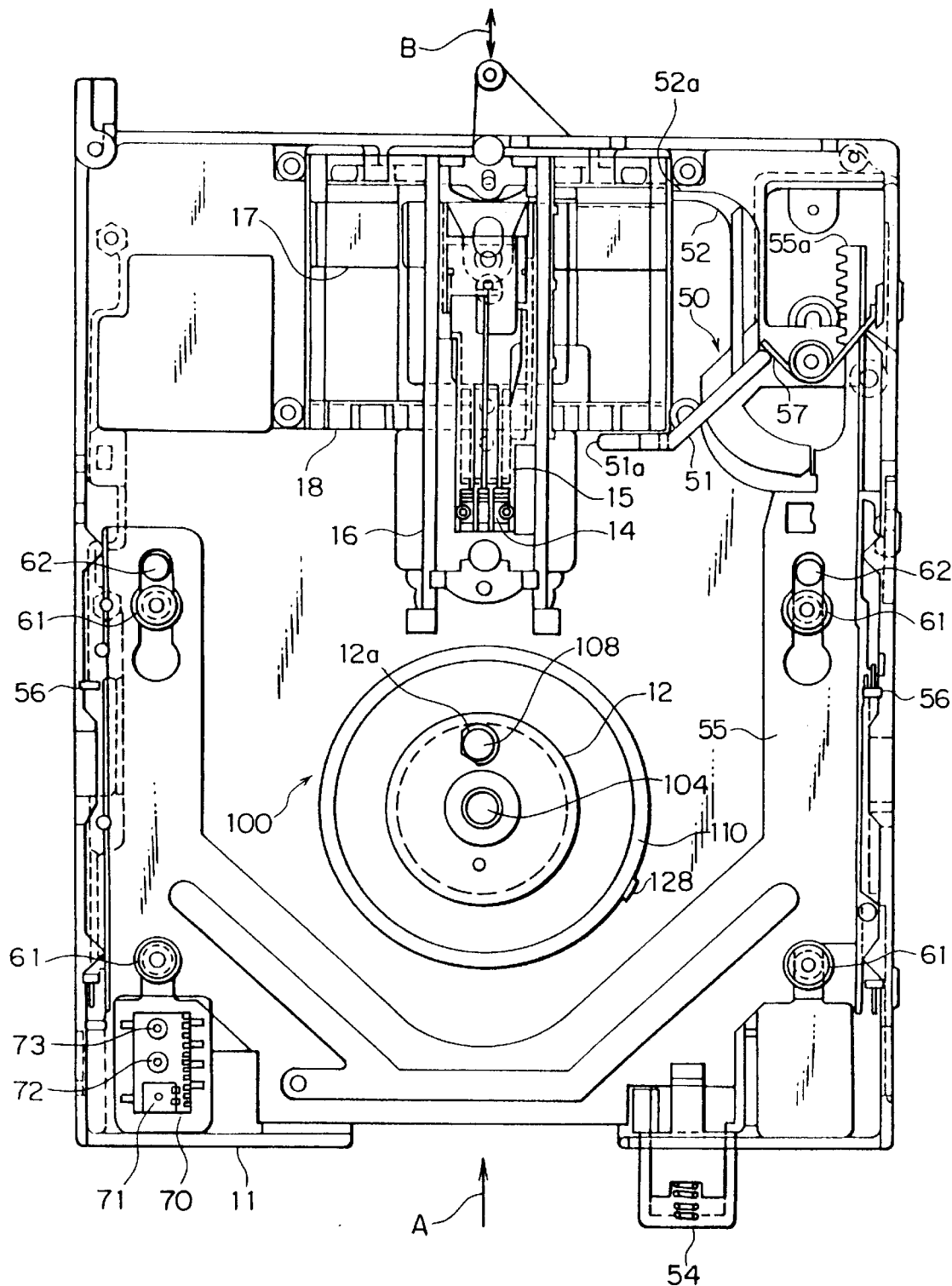
FIG. 2 is a plan view of the floppy disk drive having the disk holding mechanism according to this invention.

FIG. 2 shows a high-density floppy disk drive (FDD) 10 for carrying out data recording and reproducing operations upon the magnetic disk medium 41 of the large-capacity floppy disk 40 illustrated in FIG. 2.

Referring to FIGS. 1 and 2, the large-capacity floppy disk 40 is inserted in the high-density floppy disk drive 10 in the direction depicted by the arrow A in FIG. 2. The large-capacity floppy disk 40 thus inserted is held on a disk table 12 rotatably supported on a top surface of a main frame 11 with their center axes coincident with each other. The disk table 12 is rotated by a spindle motor (which will later be described) embedded in a recessed portion (which will later be described) of the main frame 11 so that the magnetic disk medium 41 of the large-capacity floppy disk 40 is rotated at a high speed of, for example, 3600 rpm. To a rear surface of the main frame 11, a printed wiring board (not shown) with a number of electronic components mounted thereon is attached.

The high-density floppy disk drive 10 has a magnetic head (not shown) for carrying out data writing/reading operations upon the magnetic disk medium 41 of the large-capacity floppy disk 40. The magnetic head is held by a carriage 15 through a gimbal 14. A combination of the magnetic head, the gimbal 14, voice coils 17, a FPC (flexible printed circuit), a scale, a spring holder, and a spring is called a carriage assembly. The carriage 15 is disposed on the top surface of the main frame 11 with a space kept from the main frame 11 and can move the magnetic head in a predetermined radial direction (depicted by an arrow B in FIG. 2) with respect to the large-capacity floppy disk 40.

The carriage 15 has is supported and guided at its bothside bottom ends by a pair of guide bars 16 extending in parallel to the predetermined radial direction B.

The carriage 15 is driven in the predetermined radial direction B by a voice coil motor which will presently be described. Specifically, the voice coil motor comprises a pair of the voice coils 17 located at the back side of the carriage 15 and wound around drive shafts parallel to the predetermined radial direction B, and a magnetic circuit 18 for producing a magnetic field intersecting an electric current flowing through each voice coil 17. In the voice coil motor of the above-mentioned structure, let the electric current flow through each voice coil 17 in a direction intersecting the magnetic field produced by the magnetic circuit 18. In this event, due to an interaction between the electric current and the magnetic field, drive force is produced in an extending direction of the drive shafts in accordance with the Fleming's left-hand rule which is well known. By the driving force, the voice coil motor moves the carriage 15 in the predetermined radial direction B.

The floppy disk drive 10 includes a shutter drive mechanism for opening and closing the shutter 49 (FIG. 1) of the floppy disk 40, an eject mechanism for ejecting the floppy disk 40, and a carriage lock mechanism for locking the carriage 15 upon ejection.

A lever unit 50 comprises an eject lever 51 and a lock lever 52. The eject lever 51 serves both as an element of the shutter drive mechanism for opening and closing the shutter 49 of the floppy disk 40 and as an element of the eject mechanism for ejecting the floppy disk 40 from the floppy disk drive 10. The lock lever 52 is disposed in the vicinity of the carriage 15 to lock the carriage upon ejection.

The eject mechanism comprises an eject button 54 protruding outward from an outer surface of a front bezel (not shown) of the floppy disk drive 10, an eject plate 55 for positioning the floppy disk 40 inserted through a receiving slot (not shown) of the front bezel so as to face one surface thereof, and an eject spring having one end engaged with the eject plate 55 and the other end engaged with a disk holder unit (later depicted at 60 in the figure). The eject plate 55 has a rack 55a formed at a forward end in a depth direction. The rack 55a is engaged with a pinion (not shown) rotatably supported on the top surface of the main frame. The lever unit 50 is urged by a spring mechanism 57 in a counterclockwise direction.

It is assumed here that the floppy disk 40 is inserted into the floppy disk drive 10. Specifically, when the floppy disk 40 is inserted in the direction depicted by the arrow A in FIG. 2, the forward end 51a of the eject lever 51 is engaged with an upper righthand end of the shutter 49 (FIG. 1). Following the movement of the floppy disk 40, the lever unit 50 is rotated clockwise. Consequently, the forward end 51a of the eject lever 51 opens the shutter 49.

When the floppy disk 40 is completely received in the floppy disk drive 10, the floppy disk 40 in this state is held in the disk holder unit (later depicted at 60 in the figure) by a disk lock mechanism which is not illustrated in the figure.

Figure 3A:
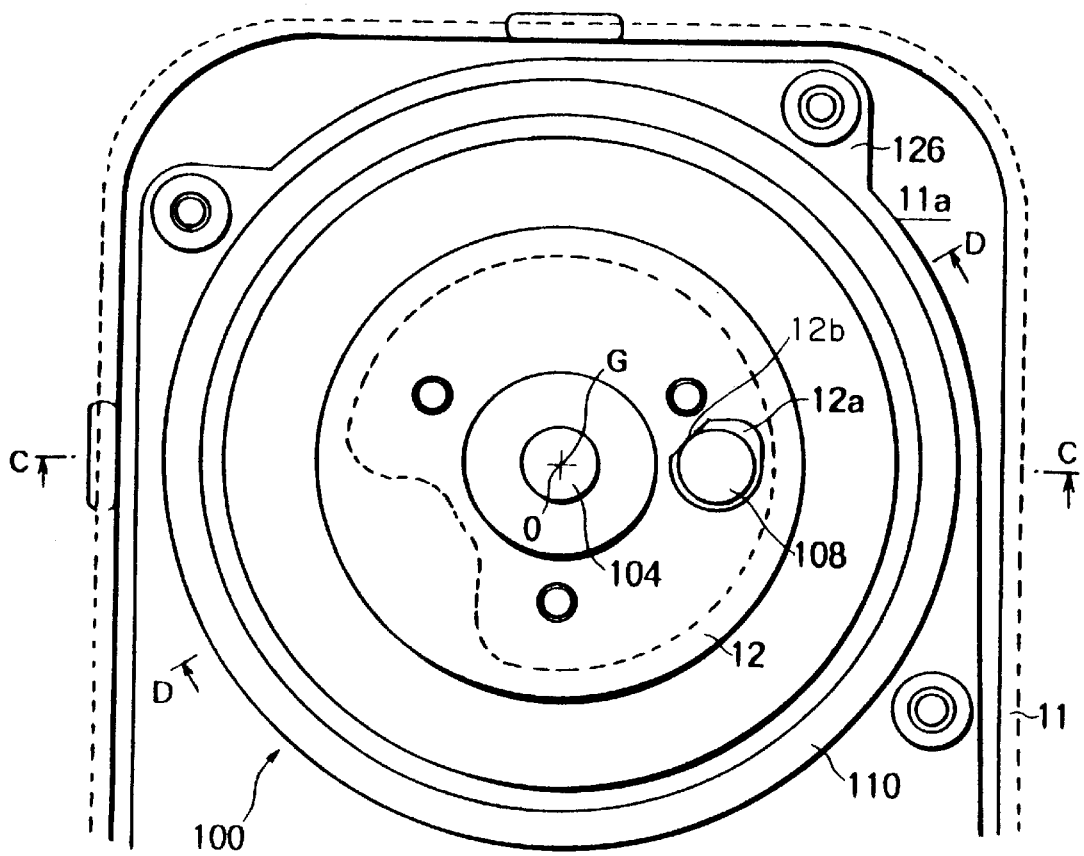
FIGS. 3A and 3B show in detail a spindle motor used in the floppy disk drive illustrated in FIG. 2, FIG. 3A being a plan view of the spindle motor, FIG. 3B being a sectional view taken along a line C—C at the side of a rotor of the spindle motor in FIG. 3A and taken along a line D—D at the side of a stator of the spindle motor in FIG. 3A.

Next referring to FIGS. 3A and 3B, description will be made about the spindle motor 100 and the disk chucking mechanism used in the high-density floppy disk drive. FIG. 3A is a plan view while FIG. 3B is a sectional view taken along a line C—C at the side of a rotor in FIG. 3A and taken along a line D—D at the side of a stator in FIG. 3A.

Figure 3B:
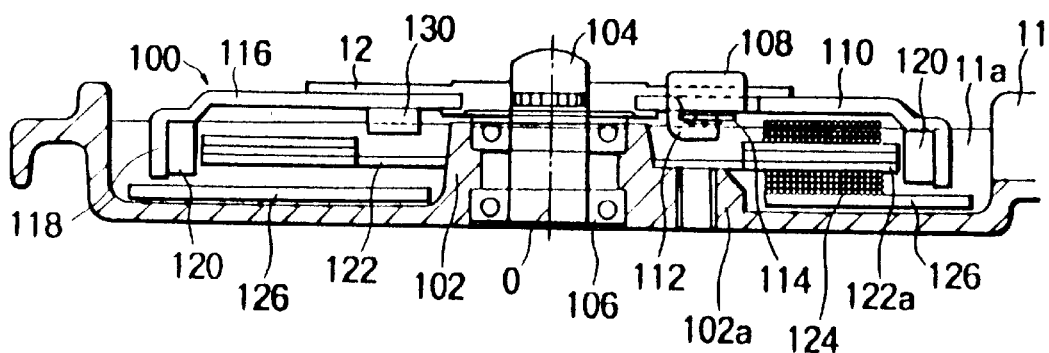

The spindle motor 100 illustrated in FIGS. 3A and 3B is of a type mounted not on the rear surface of the main frame 11 but on the top surface of the main frame 11 (i.e., on the surface at the side of insertion of the floppy disk 40 (FIG. 1)) and, in particular, of a type embedded in the recessed portion 11a of the main frame 11.

The main frame 11 has a bearing metal 102 of a generally cylindrical shape disposed in the recessed portion 11a. The bearing metal 102 stands up to be substantially perpendicular to a principal surface of the main frame 11. In the bearing metal 102, the spindle shaft 104 is supported through a ball bearing 106 to be substantially perpendicular to the principal surface of the main frame 11 and to be rotatable with respect to the main frame 11. The spindle shaft 104 serves as a rotary shaft O of the magnetic disk medium of the large-capacity floppy disk 40 inserted into the high-density floppy disk drive. To the upper end of the spindle shaft 104, the disk table 12 of a circular shape is fitted. The disk table 12 has a principal surface extending in a direction perpendicular to a longitudinal direction (direction of the rotary shaft O) of the spindle shaft 104.

Thus, the disk table 12 is rotatably supported on the top surface of the main frame 11 and holds the large-capacity floppy disk 40 inserted in the high-density floppy disk drive with their center axes (rotary shaft O) coincident with each other.

The disk table 12 has a diameter greater than that of the disk hub 43 (FIG. 1) and smaller than that of the circular opening 42a (FIG. 1).

The disk table 12 has a table-side driving elongated hole 12a formed at a position corresponding to the chucking hole 43b (FIG. 1). Through the table-side driving elongated hole 12a, the chucking pin 108 is loosely fitted in the chucking hole 43b. The table-side driving elongated hole 12a has a slant portion 12b. Being urged upward, the chucking pin 108 is attached through a holding portion 114 to one end of a flexible arm 112 of a magnet case 110 attached to a lower surface of the disk table 2 so that the chucking pin is rotatable and freely movable in the table-side driving elongated hole 12a. Thus, when a load is applied to the chucking pin 108 from the above, the chucking pin 108 is moved downward (sunk).

The magnet case 110 is made of iron and formed into a generally tray-like shape by pressing. Specifically, the magnet case 110 comprises a disk plate portion 116 and an outer peripheral wall 118. The disk plate portion 116 extends in parallel to the extending direction of the disk table 12. The outer peripheral wall 118 is downwardly bent at an outer periphery of the disk plate portion 116. A ring-shaped main magnet 120 is fixed on an inner surface of the outer peripheral wall 118.

At any rate, a combination of the spindle shaft 104, the disk table 12, the chucking pin 108, the magnet case 110, the arm 112, the holding portion 114, and the main magnet 120 forms the rotor of the spindle motor 100. The rotor also serves as the disk chucking mechanism.

The bearing metal 102 has a flange portion 102a. To the flange portion 102a, a core 122 is fixedly attached by a screw (not shown). The core 122 has a plurality of magnetic pole forming portions 122a radially extending at an equiangular space. A coil 124 is wound around each magnetic pole forming portion 122a. Thus, a combination of the magnetic pole forming portion 122a and the coil 124 forms an electromagnet (magnetic pole). The electromagnet is arranged opposite to the main magnet 120 with a predetermined space (gap) kept therefrom. At any rate, a combination of the cores 122 and the coils 124 forms the stator of the spindle motor 100.

At a desired position on an outer surface of the outer peripheral wall 118 of the magnet case 108, an index detection magnet 128 in the form of a generally rectangular prism is fixed. In the recessed portion 11a of the main frame 11, a printed board 126 is received and fixed by a screw (not shown). On the printed board 126, a magnetic sensor (not shown) is mounted to detect magnetism from the index detection magnet 128 (FIG. 2).

The spindle motor 100 illustrated in the figure has a balancer 130 as balancing means. The balancer 130 is attached to a lower surface of the magnet case 110 at the side opposite to the chucking pin 108 with the spindle shaft 104 interposed therebetween. Thus, the center of gravity G of the rotor is made to coincide with the rotary shaft O to balance the rotor during rotation (in particular, during high-speed rotation).

Figures 4A, 4B, 4C, 4D:
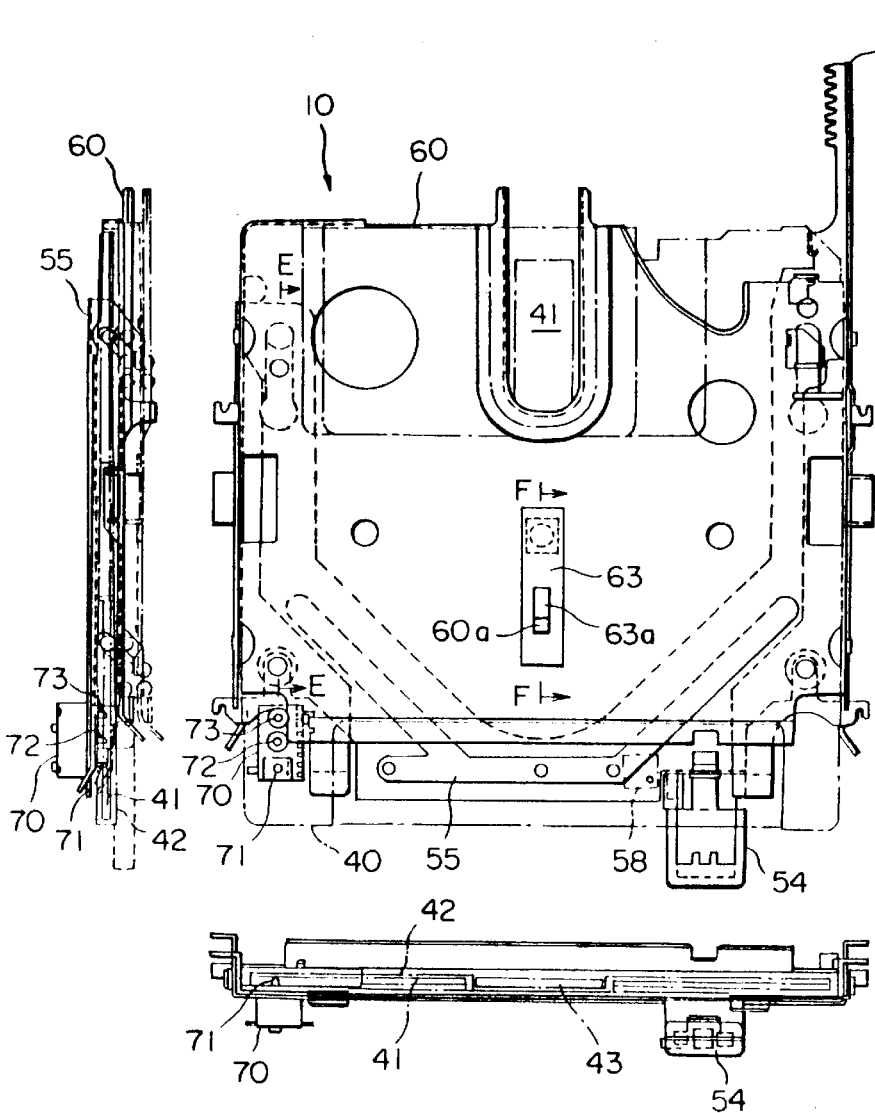
FIGS. 4A through 4D show the floppy disk drive having the disk holding mechanism according to one embodiment of this invention, FIG. 4A being a plan view of the floppy disk drive, FIG. 4B being a front view of the floppy disk drive, FIG. 4C being a left side view of the floppy disk drive, FIG. 4D being a right side view of the floppy disk drive.

Next referring to FIGS. 4A through 4D in addition to FIG. 2, the disk holding mechanism used in the high-density floppy disk drive 10 will be described. FIG. 4A is a plan view of the disk holding mechanism, FIG. 4B is a front view of the disk holding mechanism, FIG. 4C is a left side view of the disk holding mechanism, and FIG. 4D is a right side view of the disk holding mechanism.

The high-density floppy disk drive 10 has, as the disk holding mechanism, the disk holder unit 60 for holding the floppy disk 40 and positioning means for the floppy disk 40 which will presently be described.

Figure 5:
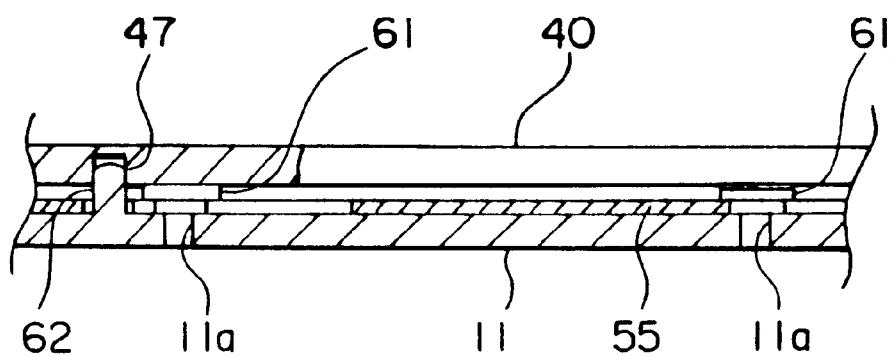
FIG. 5 is a sectional view taken along a line E—E in FIG. 4A.

Referring to FIG. 5 in addition, the positioning means illustrated in the figure comprises four vertical positioning pins 61 formed on the main frame 11 at positions corresponding to four corners of the floppy disk 40 to position the floppy disk 40 in the vertical direction, and two horizontal positioning protrusions 62 formed on the main frame 11 at both forward sides in the inserting direction A to position the floppy disk 40 in the horizontal direction. The horizontal positioning protrusions 62 are integrally formed with the main frame 11 by die-casting to be engaged with the engaging holes 47 and 48 of the floppy disk 40 upon holding the disk. The vertical positioning pins 61 are press-fitted into press-fit holes 11a formed in the main frame 11.

In the above-mentioned manner, the floppy disk 40 is held in the disk holder unit 60 and positioned by the vertical positioning pins 61 and the horizontal positioning protrusions 62. However, although the peripheral portion of the floppy disk 40 is positioned and fixed by the above-mentioned positioning means, the center portion (disk hub) of the floppy disk 40 is simply put on the disk table 12 and magnetically attracted to the disk table 12.

While the floppy disk drive 10 executes data writing/reading operations upon the magnetic disk medium 41 of the floppy disk 40 (i.e., during operation of the floppy disk drive 10), the floppy disk drive 10 may be subjected to external shake or shock. In this event, the disk table 12 of the disk chucking mechanism vibrates in the vertical direction because the disk table has a clearance with respect to a drive body of the floppy disk drive 10. Since the disk hub 43 of the floppy disk 40 is no more than magnetically attracted onto the disk table 12, the floppy disk 40 itself vibrates in the vertical direction with respect to the drive body. Vibration of the floppy disk 40 in the vertical direction with respect to the drive body brings about unstable head touch to the magnetic disk medium 41 of the floppy disk 40 when it is accessed by the magnetic head. This results in occurrence of a data reading error for the magnetic disk medium 41.

Figure 6:
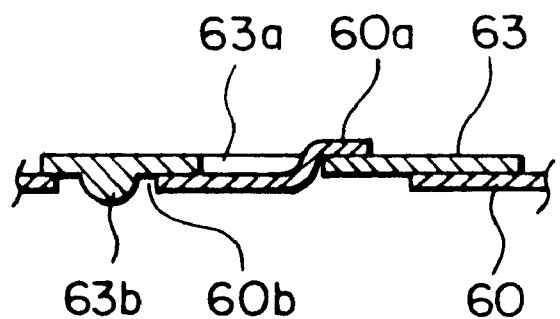
FIG. 6 is a sectional view taken along a line F—F in FIG. 4A.

This invention aims to solve the above-mentioned problem. Specifically, as shown in FIG. 6, the disk holding mechanism according to this invention has a leaf spring 63 for urging a substantial center of the floppy disk 40 downwardly from an upper surface of the floppy disk 40 when the floppy disk 40 is held in the disk holder unit 60. Thus, even if the floppy disk drive 10 is subjected to external shake or shock, the floppy disk 40 is prevented from vibrating in the disk holder unit 60. In other words, vertical movement of the floppy disk 40 itself can be restricted. It is therefore possible to constantly maintain stable head touch of the magnetic head to the magnetic disk medium 41. As a result, occurrence of the data reading error can be prevented.

Referring to FIG. 6 in addition to FIGS. 4A through 4D, the leaf spring 63 has an opening 63a formed at its center. By engaging the opening 63a with an engaging piece 60a of the disk holder unit 60, the leaf spring 63 is attached to an upper surface of the disk holder unit 60. The disk holder unit 60 has an opening 60b formed at a position corresponding to the center of the floppy disk 40. The leaf spring 63 has a projecting portion 63b protruding through the opening 60b downwardly from the upper surface of the disk holder unit 60. The projecting portion 63b urges the substantial center of the floppy disk 40 downwardly from the upper surface of the floppy disk 40.

Figure 7:
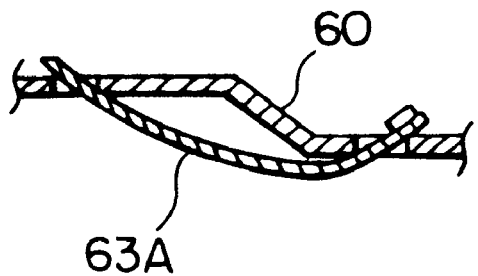
FIG. 7 is a sectional view similar to FIG. 6 but shows a disk holding mechanism according to another embodiment of this invention.

As illustrated in FIG. 6, the leaf spring 63 as an urging member is a cantilevered spring. Alternatively, use may be made of a double-support leaf spring 63A as illustrated in FIG. 7.

It will be understood that the urging member is not restricted to the leaf spring but may be any other component having an elasticity. The urging member may be made of iron, nonferrous metal, plastics, and sponge. At any rate, use may be made of any material having flexibility.

An eject switch 58 illustrated in FIGS. 4A and 4D produces a data write inhibit signal immediately after the eject button 54 is operated and before the eject mechanism actually starts the operation.

In the high-density floppy disk drive 10 illustrated in the figure, a switch unit 70 is mounted on the printed wiring board (not shown) at a lefthand corner of the backward end in the insertion direction A. The switch unit 70 comprises a push switch. The switch unit 70 serves to detect the write protection hole (described in conjunction with FIG. 1), the large-capacity identification hole 45 (FIG. 1), and the type identification hole 46 (FIG. 1). Specifically, the switch unit 70 comprises a write control switch 71 formed at a position corresponding to the write protection hole to detect an open/close state of the write protection hole, a large-capacity identification switch 72 formed at a position corresponding to the large-capacity identification hole 45 to identify whether the floppy disk inserted is the large-capacity floppy disk 40 or the normal-capacity floppy disk, and a type identification switch 73 formed at a position corresponding to the type identification hole 46 to detect presence or absence of the type identification hole 46.

It will readily be understood that this invention is not restricted to the foregoing embodiments and can be modified and changed in various manners within a scope of this invention. For example, although the foregoing embodiments are directed to the high-density floppy disk drive which can access the large-capacity floppy disk drive, this invention is also applicable to a normal-density dedicated floppy disk drive which can access the normal-capacity floppy disk alone.

As is obvious from the foregoing description, the disk holding mechanism according to this invention comprises the urging member for urging the substantial center of the disk downwardly from the upper surface of the disk with the disk held in the disk holder unit. Therefore, even if the disk apparatus is subjected to external shake or shock, the disk is prevented from vibrating within the disk holder unit. In other words, vertical movement of the disk itself can be restricted. Thus, it is possible to constantly maintain stable head touch of the magnetic head to the magnetic disk medium and to prevent occurrence of the data reading error.

What is claimed is:

1. A disk holding mechanism which is for use in a disk apparatus and which comprises a disk holder unit for holding a disk inserted into said disk apparatus, said disk comprising a magnetic disk medium and a case covering said magnetic disk medium, wherein:

said disk holder unit comprises a leaf spring attached to an upper surface thereof for downwardly urging an upper surface of said case of said disk at a substantial center of said disk with said disk held in said disk holder unit so that said leaf spring prevents said disk from vibrating within said disk holder unit even if said disk apparatus is subjected to external shake or shock.

2. A disk apparatus comprising a disk holding mechanism having a disk holder for holding a disk inserted in said disk apparatus, said disk comprising a magnetic disk medium and a case covering said magnetic disk medium, wherein:

said disk holder unit comprises a leaf spring attached to an upper surface thereof for downwardly urging an upper surface of said case of said disk at a substantial center of said disk with said disk held in said disk holder unit so that said leaf spring prevents said disk from vibrating within said disk holder unit even if said disk apparatus is subjected to external shake or shock.

* * * * *